Aug. 27, 1940. J. SOBEL 2,212,991
DOUGH MOLDING MACHINE
Filed July 1, 1939 4 Sheets-Sheet 1
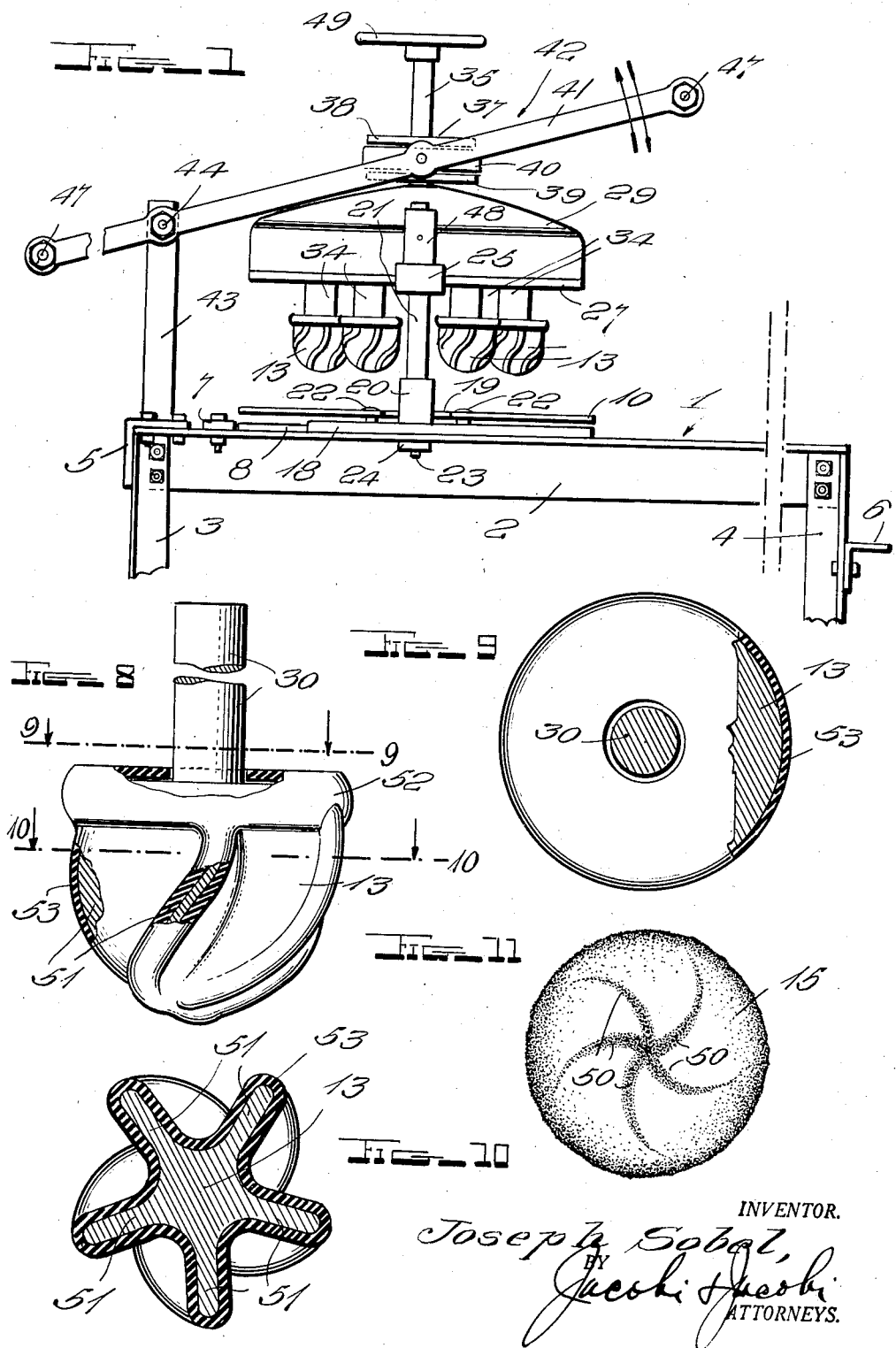
INVENTOR.
Joseph Sobel,
BY Jacobi & Jacobi
ATTORNEYS.

Aug. 27, 1940.                J. SOBEL                 2,212,991
                        DOUGH MOLDING MACHINE
                        Filed July 1, 1939        4 Sheets-Sheet 2
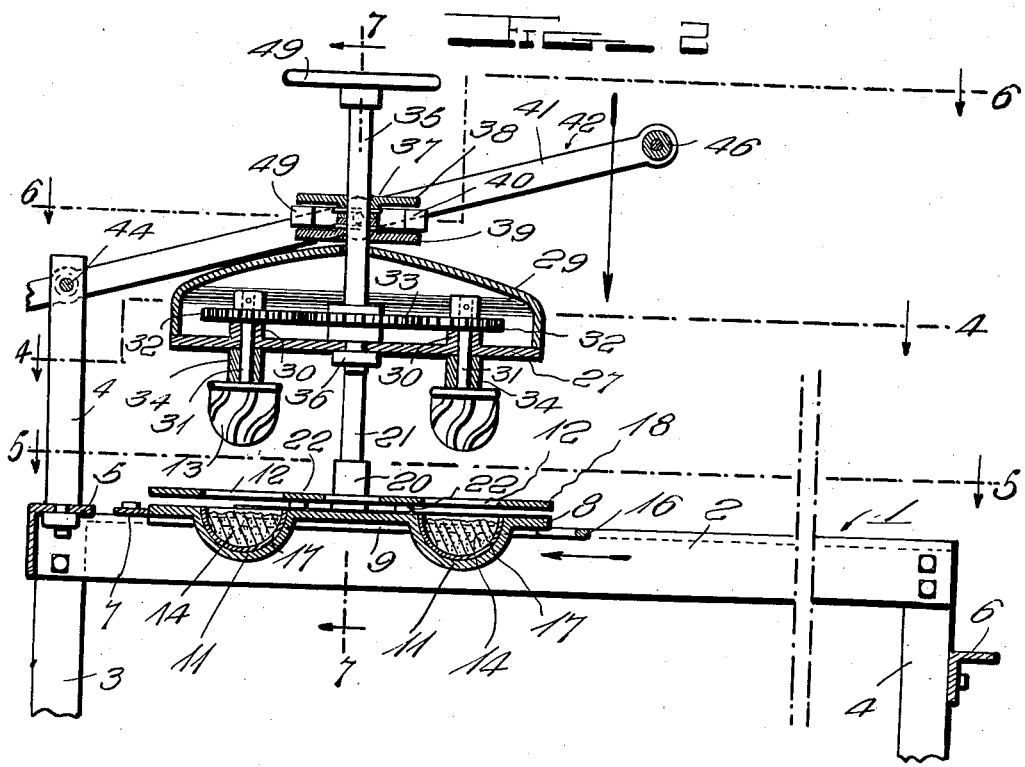
INVENTOR.
Joseph Sobel,
BY
Jacob & Jacob
ATTORNEYS.

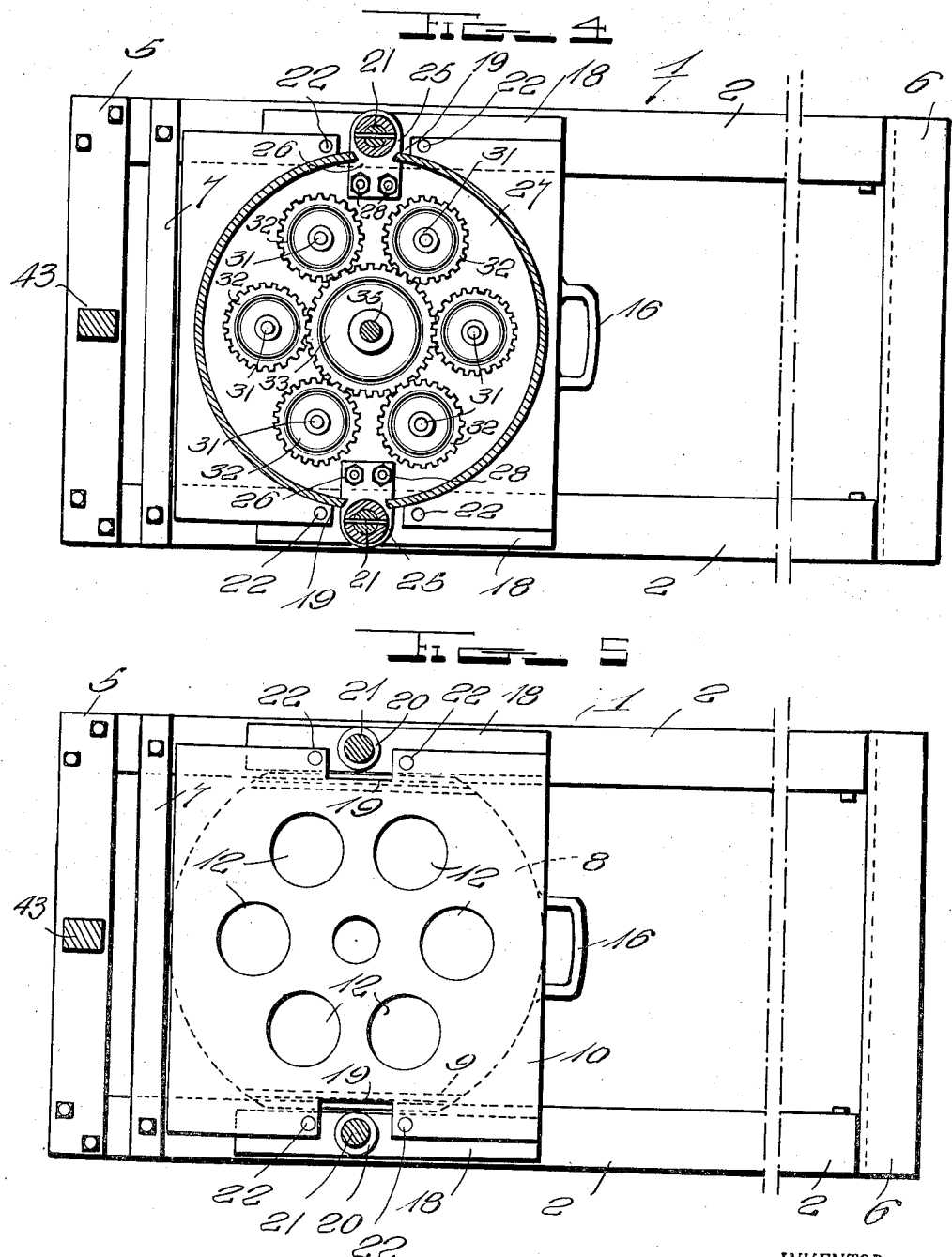

Aug. 27, 1940.   J. SOBEL   2,212,991
DOUGH MOLDING MACHINE
Filed July 1, 1939   4 Sheets-Sheet 4

INVENTOR.
Joseph Sobel,
BY
ATTORNEYS.

Patented Aug. 27, 1940

2,212,991

UNITED STATES PATENT OFFICE 2,212,991

DOUGH MOLDING MACHINE

Joseph Sobel, Philadelphia, Pa.

Application July 1, 1939, Serial No. 282,557

15 Claims. (Cl. 107—8)

This invention relates to a dough shaping or molding machine and it is one object of the invention to provide a machine by means of which dough may be shaped to form rolls of the type known as "Kaiser" rolls.

Another object of the invention is to provide a machine of this character wherein the dough is placed in cups of a tray and the tray then shifted into place under dies which are moved downwardly until they enter the cups and make contact with the dough to impart the desired shape thereto.

Another object of the invention is to provide dies corresponding in number to the cups, these dies being rotatably held by a common carrier and adapted to be simultaneously turned after they have been lowered into the cups. It will thus be seen that since the dies are all moved downwardly at the same time and simultaneously turned when in engagement with the dough, the rolls will be of similar size and shape when baked.

Another object of the invention is to so form the frame of the machine and so mount the tray of cups that the tray may be applied to the frame and shifted thereon into and out of position under the dies.

Another object of the invention is to so mount the tray that its sliding movement in one direction will be limited and thus cause the cups to be properly positioned under the dies when the tray is under the shaping means carrying the dies.

Another object of the invention is to provide improved means for mounting the shaping means for vertical movement and in addition also provide improved actuating means for imparting vertical movement to the shaping means and shifting the dies into and out of a lowered position in which they will enter the cups.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawings, wherein:

Figure 1 is a side elevation of the improved machine.

Figure 2 is a longitudinal sectional view taken vertically through the machine, the dies being in a raised position.

Figure 3 is a view similar to Figure 2 showing the dies lowered and extending into the cups of the tray.

Figure 4 is a view taken along the line 4—4 of Figure 2 with parts of the machine in section and parts in top plan.

Figure 5 is a view taken along the line 5—5 of Figure 2.

Figure 8 is an enlarged view of one of the dies, the view being principally in side elevation and partially in section.

Figure 9 is a view taken along the line 9—9 of Figure 8.

Figure 10 is a sectional view taken transversely through the dies along the line 10—10 of Figure 8.

Figure 11 is a top plan view of a roll formed by the improved machine.

Figure 6:
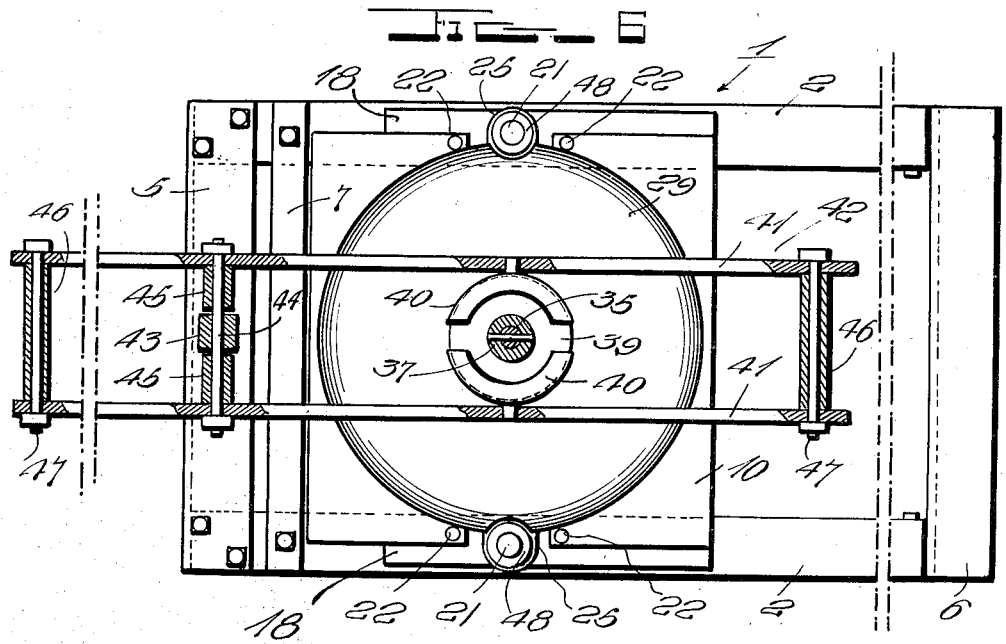
Figure 6 is a view taken along the line 6—6 of Figure 2.
Figure 7:
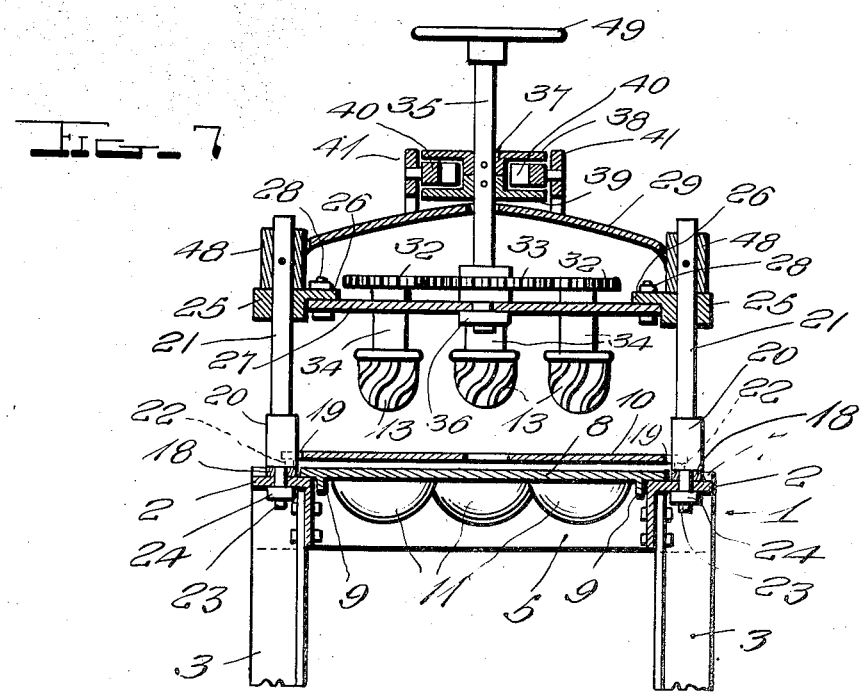
Figure 7 is a vertical sectional view taken transversely through the machine along the line 7—7 of Figure 2.

This improved dough molding machine has a frame or table 1, the side bars 2 of which are supported by corner legs 3 and 4. The side bars and the legs are formed of angle metal and there have also been provided cross bars 5 and 6 formed of angle metal, the cross bar 5 being bolted to rear ends of the side bars and the cross bar 6 being bolted to the front legs 4 and having its horizontal flange projecting forwardly therefrom. In advance of the cross bar 5 is a strip or bar 7 bolted upon the horizontal flanges of the side bars and extending transversely across the table in position to serve as a stop bar.

The tray or pan 8 is of such width that its side edge portions rest upon the side bars 2 and in spaced relation to its side edges the pan carries depending flanges or strips 9 which serve to guide shifting movement of the pan when it is slid along the side bars from a position in front of the plate or shield 10 to a position under the plate. When the pan is in advance of the shield, dough may be placed in the cups 11 of the pan and when the pan is slid rearwardly along the side bars until its rear edge abuts the stop bar 7, the cups will be located under the openings 12 formed in the plate in alinement therewith so that dies 13 may be passed downwardly through the openings 12 from the elevated position of Figure 2 and into the cups as shown in Figure 3 to embed themselves in the dough 14 and then be turned to shape the dough in such a manner that when the dough is baked, rolls 15 of the "Kaiser" type will be formed. A handle 16 projects forwardly from the pan or tray in order that it may be easily slid longitudinally upon the side bars of the frame. The pans or trays may be used for baking the rolls or merely for shaping the dough and in order that the dough or rolls may be easily removed from the cups, the cups have been provided with liners 17 formed of cheese cloth, paper or the like and serving to prevent the dough or baked rolls from sticking to walls of the cups and also serving to prevent the dough from turning in the cups when the dies are turned to form spirally extending grooves in the dough.

The shield or plate 10 has its side edge portions overlying strips 18 and formed with recesses 19 to accommodate the base portions 20 of the posts 21 and in order to firmly secure the shield in place and space it upwardly from the tray, rivets 22 of the post type are employed. Threaded stems 23 extend downwardly from the posts 21 and through the strips 18 as well as through the side bars 2 and when the securing nuts 24 are applied to protruding lower ends of the stems and tightened, the posts will be firmly held in place. The base portions 20 of the posts define annular shoulders and serve as stops for limiting downward movement of the blocks 25 which are slidably carried by the posts 21 and are formed with inwardly extending tongues 26 secured to opposite side portions of a plate 27 by bolts 28. The plate 27 constitutes the bottom of a gear housing 29 and is formed with bearings 30 through which the stems 31 of the dies 13 are rotatably received and the upper portions of these stems which project upwardly from the bearings carry gears 32 meshing with a drive gear 33. Spacing sleeves 34 are provided about the stems between the dies and the lower face of the plate 27 to maintain the dies spaced downwardly from the gear housing the proper distance.

The drive gear fits about the lower portion of a rotatable shaft 35 upon which it is fixed to turn with the shaft, the lower end of the shaft being journalled through the plate 27 and held in rotatable engagement therewith by a nut 36. Above the gear housing 29, the shaft 35 carries collar 37 formed of upper and lower disks 38 and 39 spaced vertically from each other. Shoes 40 pivotally carried by side bars 41 of an operating lever 42 fit loosely between the disks 38 and 39 of the collar 37. The operating lever has its side bars pivoted to a standard 43 by a pivot rod 44 passing through the standard or post and in order to maintain the side bars properly spaced from the post there have been provided spacing sleeves 45 which fit about the pivot rod between the post and the side bars as shown in Figure 6. Handle bars 46 extend between ends of the side bars where they are held in place by bolts 47, and it will be readily understood that by grasping the handle bars, the lever may be rocked about the pivot rod 44 to shift the collar 37 together with the shaft 35 and the gear housing and move the dies toward or away from the openings 12 of the plate 10 according to which direction the lever is moved. During this movement, the shoes slide between the plates 38 and 39 of the collar 37 and binding action which would interfere with movements of the lever is, therefore, prevented. Upward movement of the gear housing is limited by sleeves or collars 48. A hand wheel 49 is mounted at the top of the shaft 35 in order that when the dies are embedded in the dough, rotary motion to a slight degree may be imparted to the shaft and the dies turned through the medium of the gears to form the dough with depressions and spirally extending grooves 50 which remain in the rolls after the rolls are baked as shown in Figure 10. The dies are formed of metal and each is tapered toward its lower end as shown in Figure 8 and formed with outstanding radially extending ribs 51. The ribs extend spirally longitudinally of the dies and at their upper ends the dies are enlarged to form outstanding annular shoulders 52 at which upper ends, the ribs terminate. The dies are covered with rubber, hardwood, Bakelite or the like, as shown at 53 to prevent the dough from sticking to the dies during shaping of the rolls and also prevent the die from puncturing the dough instead of merely forming radiating depressions therein. After the dough has been shaped, the lever is swung upwardly to raise the dies and the tray removed so that it may be placed in an oven and another tray thrust into place under the plate 10. While the dies have been shown formed with five ribs 51, it is to be understood that any number of such ribs either more or less than 5, may be provided, as desired.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a dough molding machine, means for supporting a dough holder, a die holder mounted for vertical shifting movement, a die rotatably carried by said die holder, means for shifting said die holder into and out of position to embed the die in dough carried by the dough holder, and means manually actuated independent of movement of the die holder for rotating the die while embedded in the dough.

2. In a dough molding machine, a frame, a tray removably carried by said frame and provided with dough receiving cups, said tray being slidable horizontally along the frame into and out of a molding position, a carrier over said frame shiftable vertically, a plurality of dies rotatably carried by said carrier in position to enter the cups when the carrier is shifted downwardly and be embedded in dough in the cups, means for shifting said carrier vertically, and means for turning the dies and imparting predetermined shape to dough in the cups consisting of a shaft rotatably carried by said carrier and intermeshing gears carried by the shaft and the dies.

3. In a dough molding machine, a frame having spaced bars constituting tracks, a shield spaced upwardly from said tracks and formed with openings, a tray removably resting upon said tracks and slidable back and forth along the tracks into and out of position under the shield, said tray having cups disposed under the openings of the shield when the tray is under the shield, a carrier over said frame shiftable vertically, dies rotatably carried by said carrier in position to pass through the openings and enter the cups when the carrier is moved downwardly with the tray under the shield, a rotatable shaft carried by said carrier, and gears carried by the shaft and the dies for transmitting rotary motion from the shaft to all of the dies and imparting predetermined shape to dough in the cups.

4. In a dough molding machine, a frame having spaced bars constituting tracks, a shield spaced upwardly from said tracks and formed with openings, a tray removably resting upon said tracks and shiftable along the tracks into and out of position under the shield, said tray having cups disposed under the openings of the shield when the tray is under the shield, posts rising from said frame at opposite sides of said shield, a gear housing slidable vertically along said posts, dies under said gear housing located over the openings in said shield and having stems journaled through the bottom of the gear housing and projecting into the same, a rotatable shaft disposed vertically in said gear housing and projecting upwardly therefrom, means for shifting the gear housing and shaft vertically into and out of a lowered position disposing the dies through the openings with their lower portion embedded in dough in the cups, and means for transmitting rotary motion from said shaft to said stems to turn the dies and impart predetermined shape to dough in the cups.

5. In a dough molding machine, a frame having tracks spaced transversely from each other, guides extending along said tracks, a shield extending between said tracks and over the same with its side portions secured in overlapping relation to the guides, a tray removably resting upon said tracks and shiftable along the same into and out of place under the shield, said shield having openings therein, the tray having cups disposed under the openings when the tray is under the shield, posts rising from said guides at opposite sides of said shield, a gear housing, mountings at opposite sides of said gear housing engaged about the posts for guiding vertical movement of the gear housing, dies having stems journaled through the bottom of the gear housing to rotatably mount the dies over the openings in said shield, means for shifting the gear housing from a raised position to a lowered position disposing the dies through the openings and into the cups, and means for rotating said stems to turn the dies and impart predetermined shape to dough in the cups.

6. In a dough molding machine, a frame having tracks spaced transversely from each other, a shield extending between the tracks and spaced upwardly therefrom, a tray resting upon said tracks and shiftable along the same into and out of place under said shield, the shield having openings therein, said tray having cups disposed under the openings when the tray is under the shield, vertical posts at opposite sides of said shield, a housing having a bottom, guides at opposite sides of said housing engaging said posts to guide vertical movement of the housing, dies carried by said housing and depending therefrom over the openings, means for shifting said housing along said posts from a raised position to a lowered position disposing the dies through the openings and into the cups, and means for turning the dies to impart predetermined shape to dough in the cups.

7. In a dough molding machine, a frame having tracks spaced transversely from each other, a shield extending between the tracks and spaced upwardly therefrom, a tray resting upon said tracks and shiftable along the same into and out of place under said shield, the shield having openings therein, said tray having cups disposed under the openings when the tray is under the shield, vertical posts at opposite sides of said shield, a housing having a bottom, guides at opposite sides of said housing engaging said posts to guide vertical movement of the housing, dies over said openings having stems journaled through the bottom of said housing, a rotatable shaft mounted vertically in said housing and projecting upwardly therefrom, gears carried by said stems within said housing, a master gear carried by said shaft and meshing with the gears of said stems, and means for shifting the gear housing along said posts.

8. In a dough molding machine, a frame having tracks spaced transversely from each other, a shield extending between said tracks and spaced upwardly therefrom, a tray resting upon said tracks and shiftable thereon into and out of place under the shield, the shield having openings therein, said tray having cups disposed under the openings when the tray is under the shield, posts at opposite sides of said shield, a housing shiftable vertically between said posts and having a bottom, dies disposed over said openings and having stems journaled through the bottom of said housing, a rotatable shaft mounted vertically in said housing and projecting upwardly therefrom, means for transmitting rotary motion from said shaft to the stems for turning the dies and imparting predetermined shape to dough in the cups, a collar carried by said shaft and having upper and lower flanges spaced vertically from each other, and actuating means having members engaged between said flanges for shifting the shaft and the housing vertically from a raised position to a lowered position disposing the dies through the openings of the shield and into said cups.

9. In a dough molding machine, a frame having tracks spaced transversely from each other, a shield extending between said tracks and spaced upwardly therefrom, a tray resting upon said tracks and shiftable thereon into and out of place under the shield, the shield having openings therein, said tray having cups disposed under the openings when the tray is under the shield, posts at opposite sides of said shield, a housing shiftable vertically between said posts and having a bottom, dies disposed over said openings and having stems journaled through the bottom of said housing, a rotatable shaft mounted vertically in said housing and projecting upwardly therefrom, means for transmitting rotary motion from said shaft to the stems for turning the dies and imparting predetermined shape to dough in the cups, a collar carried by said shaft and having upper and lower flanges spaced vertically from each other, a standard rising from said frame, a lever having side bars and handle bars mounted between ends of the side bars, a pivot rod for said lever extending through the standard and through the side bars in spaced relation to ends of the lever, and shoes pivotally carried by said side bars and projecting inwardly therefrom, said shoes being loosely engaged between the flanges of said collar and serving to shift the shaft and housing from a raised position to a lowered position disposing the dies through the openings of the shield and into the cups of said tray when the lever is rocked in one direction about the pivot rod.

10. In a dough molding machine, a frame, a tray carried by said frame, the tray being provided with a plurality of dough-receiving cups, a plurality of dies shiftably mounted for movement into and out of position to extend into said cups, and manually actuated means for simultaneously turning the dies while stationary within the cups to impart predetermined shape to dough in the cups.

11. In a dough molding machine, a frame, a tray carried by said frame, the tray being formed with cups, dies shiftably mounted for movement into and out of said cups, and means for turning said dies while within the cups, said dies having dough engaging heads formed with longitudinally extending ribs about its periphery, and a covering for the head of each die entirely enclosing the same in close contacting engagement therewith and being formed of soft rubber to prevent dough from sticking to the dies.

12. In a dough molding machine, a frame, a tray carried by said frame, the tray being formed with cups, dies shiftably mounted for movement into and out of said cups, a rotatable shaft having geared connection with the dies for turning said dies while within the cups, and coverings for said dies formed of rubber to prevent dough from sticking to the dies.

13. A die for a dough molding machine comprising a body consisting of a solid metal block tapered toward one end, means at the other end of said body for rotatably mounting the same, ribs extending longitudinally of said body along the peripheral surface thereof and spirally about the body and converging toward and intersecting at the tapered end of the body, and a jacket entirely encasing the body and the ribs in close contacting engagement with all portions thereof, said jacket being formed of rubber to prevent sticking when the die is thrust into dough and turned.

14. A die for a dough molding machine comprising a unitary body formed of metal and having longitudinal ribs extending spirally about its peripheral surface, and a sheath of rubber-like material entirely encasing the body and the ribs thereof in close contacting engagement therewith.

15. In an apparatus of the character described, means for holding material to be molded, a housing, means mounting said housing for movement towards and away from the material holding means, a plurality of dies rotatably carried by said housing and having a head formed with ribs, means for shifting the housing and the dies carried thereby toward the material holding means, and manually operated means carried by said housing for simultaneously imparting turning movement to said dies.

JOSEPH SOBEL.